United States Patent [19]

Slough et al.

[11] Patent Number: 5,033,237
[45] Date of Patent: Jul. 23, 1991

[54] METHOD OF NUMERICALLY CONTROLLED PROFILE GRINDING

[75] Inventors: Jon Slough, Goshen; Kenn McEndarfer, Bremen; Timothy Randall, Elkhart, all of Ind.

[73] Assignee: Kobelco Compressors (America), Inc., Elkhart, Ind.

[21] Appl. No.: 476,768

[22] Filed: Feb. 8, 1990

[51] Int. Cl.$^5$ .............................................. B24B 1/00
[52] U.S. Cl. ............................ 51/165.71; 51/165.77; 51/281 R; 51/284 R; 51/105 EC
[58] Field of Search ..................... 51/281 R, 287, 288, 51/165 R, 165.71, 165.77, 103 R, 105 R, 105 EC, 284

[56] References Cited

U.S. PATENT DOCUMENTS

| | | | |
|---|---|---|---|
| 3,492,764 | 2/1970 | Dalton | 51/284 |
| 3,824,742 | 7/1974 | Rupp | 51/284 |
| 4,813,187 | 3/1989 | Mushardt | 51/281 R |

Primary Examiner—Frederick R. Schmidt
Assistant Examiner—M. Rachuba
Attorney, Agent, or Firm—Oblon, Spivak, McClelland, Maier & Neustadt

[57] ABSTRACT

A method of numerically controlled grinding for forming a curved profile on a workpiece. A rotary grindstone having an arc-shaped grinding periphery. The rotating grindstone is moved along the target profile of the workpiece as keeping a constant attitude thereof as far as such a condition is satisfied that the spotty contact of the arc-shaped periphery of the grindstone to the target profile is maintained. Immediately before the satisfaction of the condition expires, the attitude of the grindstone is reset to satisfy the same condition.

3 Claims, 4 Drawing Sheets

5,033,237

METHOD OF NUMERICALLY CONTROLLED PROFILE GRINDING

BACKGROUND OF THE INVENTION

1. Field of the Invention

The present invention generally relates to a method of numerically controlled profile grinding, and more particularly to a method suited for grinding of cutter blades which are used in single-index milling of helical rotors.

2. Description of the Related Art

In forming a curved surface, i.e. profile, of a workpiece by a conventional numerical control method using a grinding wheel, it is so arranged that the grinding wheel approaches a target profile from a direction normal thereto. As shown in FIG. 6 illustrating the positional relationship between the target profile A-C-B and the grinding wheel 101, the position and attitude of the grinding wheel 101 are so controlled that a radial center line 104 of the grinding wheel 101 in a sectional plane containing the axis 102 of rotation of the grinding wheel 101 is constantly aligned with the normal 105 to the profile at a grinding point C. Hence, in this case, the object of control is the position or positional coordinates of a given point of the grinding wheel 101 and the inclination of its radial center line 104 represented by differential coefficient. For example, if the target profile is a two-dimensional curve in an orthogonal coordinate system, the position and attitude of the grinding wheel is controlled by means of three control variables, namely x-coordinate, y-coordinate and differential coefficient. The profile grinding method under control as described above, however, needs as one of the control variables the differential coefficient for attitude control besides the x- and y-coordinate for positional control, this resulting in a complicated mode of control and a shortened dressing interval as grinding is done by a given portion of the grinding wheel (a given point in the section) so as to cause local concentration of progress of abrasion.

SUMMARY OF THE INVENTION

Accordingly, an essential object of the present invention is to provide a method of numerically controlled grinding for forming a curved profile on the workpiece, wherein the attitude of a rotary grindstone can be kept constant in a predetermined grinding range of the workpiece, that is, it needs no continuous change of the attitude of the grindstone in a predetermined grinding range of the workpiece.

Another object of the present invention is to provide a method of a type as described above, wherein a greater range of grinding periphery of the grindstone can be obtained.

In accomplishing these and other objects, according to the present invention, there is provided an improved numerically controlled grinding method for forming a curved profile on a workpiece by the use of a rotary grindstone wherein grinding progresses along a target profile of the workpiece. The grindstone has an arc-shaped grinding periphery in its section containing an axis of rotation thereof. An inclination angle of a bisector for a center angle of the arc is kept constant when such a condition is satisfied that the absolute value of a difference between the inclination angle of the bisector and an inclination angle of a normal to a target profile of the workpiece is not more than half of the center angle of the arc. The inclination angle of the bisector is reset so as to come close to the normal immediately before satisfaction of the condition expires. A center of curvature of the arc is constantly caused to be positioned on the normal and a minimum distance between the center of curvature of the arc and the target profile is made constantly equal to a radius of curvature of the arc.

As the grindstone, both a disc-shaped and bar-like types can be used. In use of the disc-shaped grindstone, the bisector for the center angle of the arc correspond a center line of the grindstone intersecting the axis of rotation at a right angle in the section containing the axis of rotation.

In the above method, it is preferable that the inclination angle of the bisector is reset so as to come close to the normal immediately before the absolute value of the difference between the both inclination angles exceeds a value less, by a required angle of relief, than half of the center angle of the arc.

According to the present invention the grindstone has a arc-shaped grinding periphery. Therefore, the sector defined by the arc and the center of curvature of the arc can be in the state of point contact with respect to the target profile at some point on the arc as long as the center of curvature of the arc is kept at a given point regardless of its direction.

In the method of the present invention, the control of grindstone's attitude with respect to the variation of the target profile is facilitated. Accordingly, the present invention no longer needs a mode of control requiring a high adaptability such as the attitude control in some conventional related art. That is, within a range in which the grinding point can be taken on the aforementioned arc, the control may be effected such that the grindstone's position alone is varied with its attitude unaltered. And resetting of attitude as countermeasure may only be resorted to when it is no longer possible to keep the grinding point on the arc due to excessive variation of the target profile. As a result grinding can be performed with the grinding point moving along the arc with preclusion of local abrasion of the grindstone.

BRIEF DESCRIPTION OF THE DRAWINGS

These and other objects and feature of the present invention will become apparent from the following description taken in conjunction with the preferred embodiment thereof with reference to the accompanying drawings, in which.

DETAILED DESCRIPTION OF THE INVENTION

Figure 1:
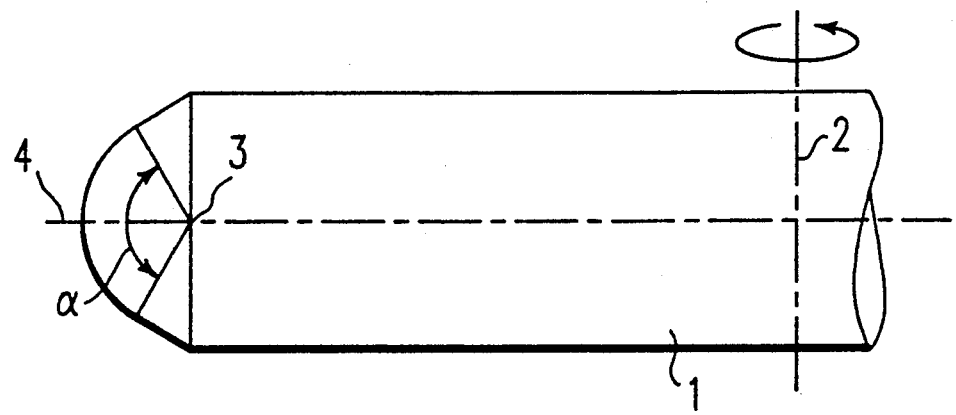
FIG. 1 is a diagrammatic view showing in section the essential parts of a grinding wheel used in a profile grinding method according to an embodiment of the present invention.

Before the description of the present invention proceeds, it is to be noted that like parts are designated by like reference numerals throughout the accompanying drawings.

Figure 2:
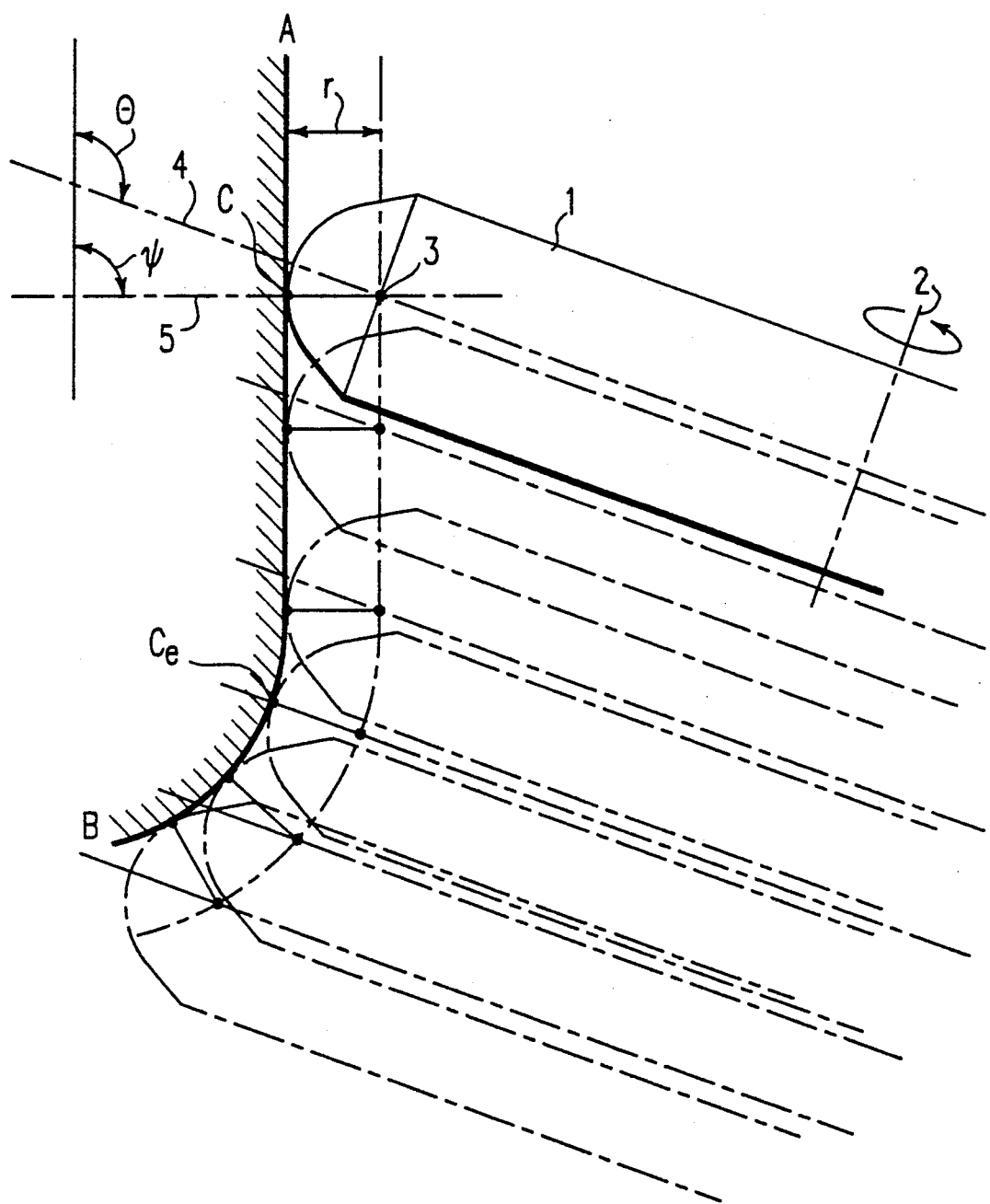
FIG. 2 is a diagrammatic view illustrating the relation between a target profile and the grinding wheel as profile grinding is performed in accordance with the above profile grinding method.

A grinding wheel 1 is disc-like and in the section containing the axis 2 of rotation the grinding periphery is formed as an arc with a center angle $\alpha = 120$ deg. The center 3 of the arc is on a radial center line 4 intersecting, at a right angle, the axis 2 of rotation as seen from the section shown in FIG. 1, and this center line 4 bisects the center angle $\alpha$. In this embodiment a target profile is to be represented by A-C-B. The point C is an arbitrary point on the target profile, this also being where the grinding wheel 1 is in contact with the target profile, namely the grinding point. Rotating about the axis 2 of rotation, the grinding wheel 1 moves in parallel along the target profile keeping its attitude as long as the point C is kept on the arc. That is, the grinding wheel 1 is moved with the distance "r" between the target profile and the center 3 of the arc kept constant. Meanwhile, the inclination angle $\theta$ of the radial center line 4 of the grinding wheel 1 is constant and the grinding point C moves along the arc. Where the inclination angle $\theta$ of the center line 4 comes equal to the inclination angle $\psi$ of the normal 5 to the target profile, namely where the grinding point becomes "Ce" in the embodiment as shown in FIG. 2, needless to say, the difference between both inclination angles $\theta$ and $\psi$ becomes zero, and judging from this, the grinding point C is kept on the arc while the inclination angle $\psi$ of the normal 5 to the target profile can vary within a range of $\pm(\alpha/2)$, hence no resetting of the inclination angle $\theta$ of the center line 4 is meanwhile needed.

Figure 3:
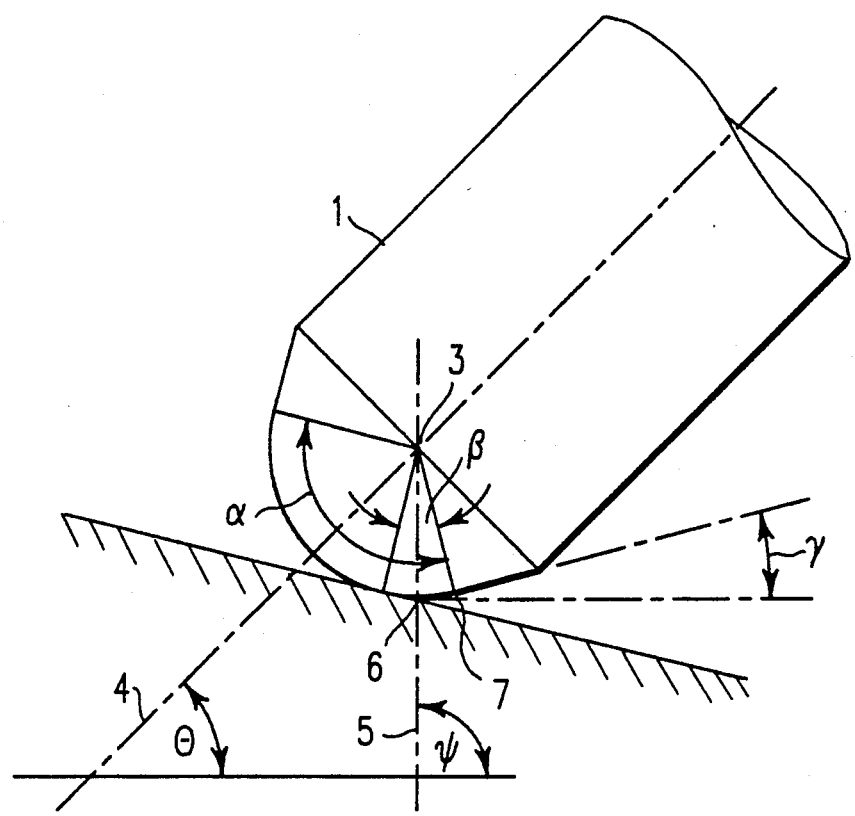
FIG. 3 is a diagrammatic view illustrating the relation between the target profile and the grinding wheel when an angle of relief is set in the above profile grinding method.

When the absolute value of the difference between the inclination angle $\theta$ of the center line 4 of the grinding wheel 1 and the inclination angle $\psi$ of the normal 5 to the target profile is in excess of $\alpha/2$, the grinding point C comes off the arc of the grinding wheel 1 if the grinding wheel 1 is further moved in parallel with the inclination angle $\theta$ unaltered. It is, therefore, necessary to do resetting of the inclination angle $\theta$ at this point. If the timing of this resetting should agree with the timing of the grinding point C reaching the outermost end of the arc, it means that the control effective range is extended to the limit to which point contact between the grinding wheel 1 and the target profile can be ensured, this resulting in loss of quality. As shown in FIG. 3, therefore, it is advisable to set the turning point 6 for resetting slightly inward of the aforementioned outermost point 7 to ensure maintenance of the state of point contact. In this case, the angle $\beta$ among the turning point 6, the center 3 of the arc and the outermost point of the arc 7 corresponds to the angle $\gamma$ of minimum relief.

Figures 4A, 4B:
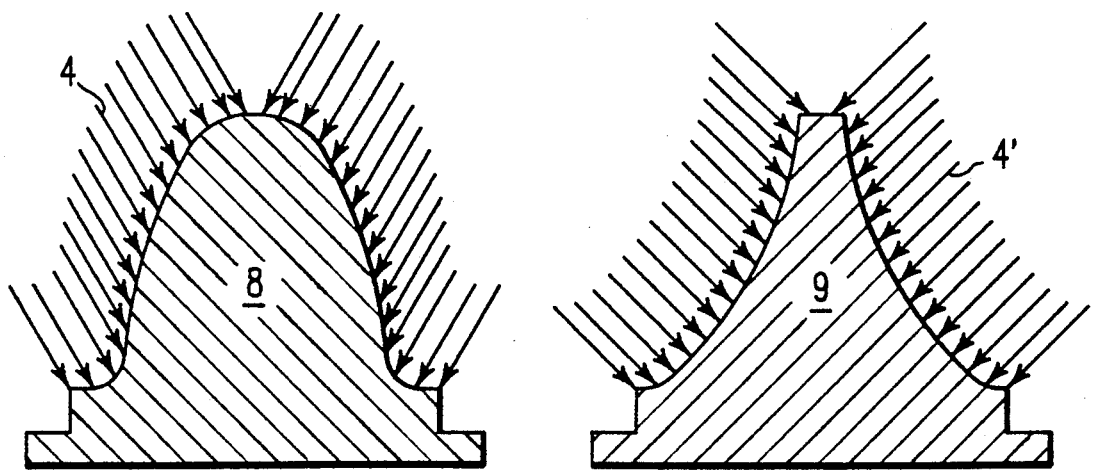
FIGS 4a and 4b are diagrammatic views showing the position and the direction of inclination of the sectional radial center line of the grinding wheel when the above profile grinding method is applied to grinding of cutter blades which is used in single-index milling of helical rotors.
Figure 6:
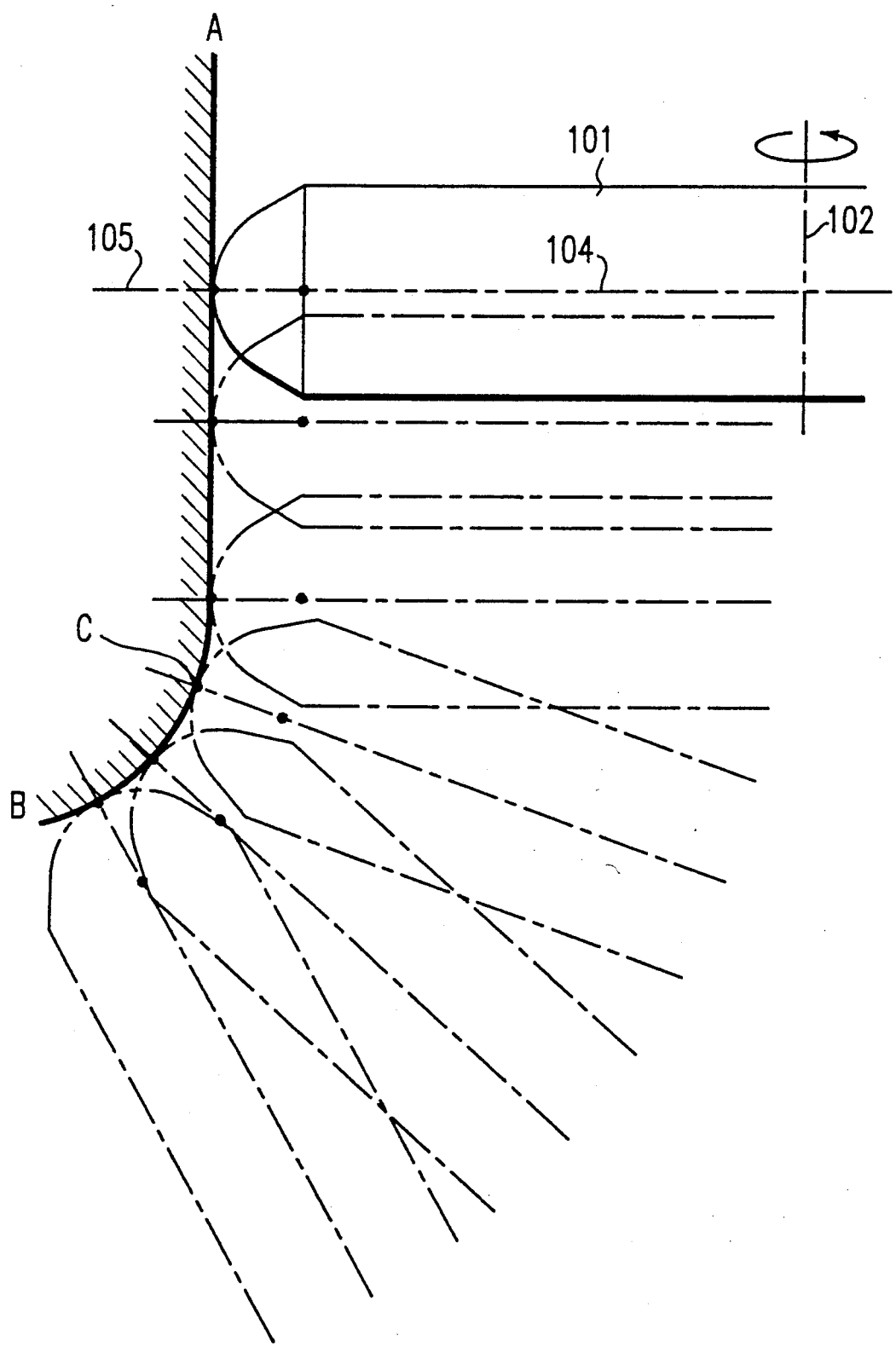
FIG. 6 is a view showing the relation between the target profile and the grinding wheel as profile grinding is performed by some other related art, as previously described.

FIGS. 4a and 4b are given to show the position and inclination direction of the center line of the grinding wheel when the profile grinding method of this invention is applied to grinding of cutter blades which are used in single-index milling of helical rotors. In the figure, reference numerals 8 and 9 designate the different cutter blades and a plurality of arrows 4' indicate the shifting state of the center line of the grinding wheel. It is understandable that the profile as a whole can be ground by resetting only once the inclination angle of the center line 4' of the grinding wheel with respect to the profile of either blade 8 or 9.

Figure 5:
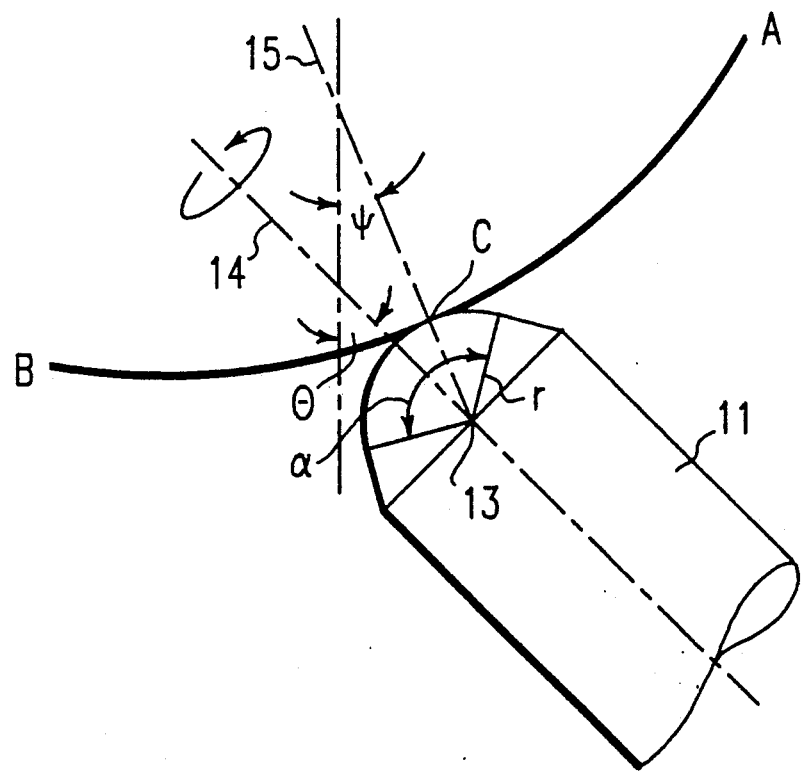
FIG. 5 is a diagrammatic view showing another embodiment of this invention.

Referring to FIG. 5 illustrating another embodiment of the present invention, a grindstone 11 is formed to be bar-like with its tip formed spherical with a center angle $\alpha$ and with its longitudinal axis 14 as the axis of rotation, and on this axis of rotation is positioned the center 13 of the spherical tip of the grindstone 11. In any arbitrary section across the axis 14 of rotation, the sector-shaped center angle $\alpha$ which appears corresponding to the sphere is bisected by the axis of rotation 14. Hence, the axis of rotation 14 in this embodiment corresponds to the center line 4 of the disc-like grinding wheel 1 according to the first embodiment shown in FIG. 2. In this case, the inclination angle $\theta$ of the axis of rotation 14 needs no resetting so long as it is within a range of the aforementioned center angle $\alpha$ in the three-dimensional space, and with this inclination angle constant numerically controlled, profile grinding of a surface of third order is feasible if the center 13 of the sphere of the tip of the grindstone is always positioned on the normal 15 to the target profile A-C-B and it is so arranged that the distance from the grinding point C on the target profile A-C-B to the sphere's center 13 is always corresponding to the aforementioned sphere's radius of curvature $\flat r$".

As apparent from the foregoing description, the profile grinding method according to the present invention makes the grinding control easier for it is not necessary to continually vary the inclination of the grinding disc or bar-like grindstone to cope with variation of a target profile and, moreover, local progress of abrasion can be reduced as the grinding point moves on the grinding disc or bar-like grindstone, maintenance of the grinding precision becomes easier and the dressing interval longer.

Although the present invention has been fully described by way of example with reference to the accompanying drawings, it is to be noted, here, that various changes and modifications will be apparent to those skilled in the art. Therefore, unless otherwise such changes and modifications depart from the scope of the present invention, they should be construed as included therein.

What is claimed is:

1. A numerical controlled grinding method for forming a curved profile on a workpiece by the use of a rotary grindstone wherein grinding progresses along a target profile of the workpiece, said grindstone having an arc-shaped grinding periphery in its section containing an axis of rotation thereof, said method comprising the steps of:

maintaining an inclination angle of a bisector for a center angle of said arc constant when such a condition is satisfied that an absolute value of a difference between said inclination angle of the bisector and an inclination angle of a normal to a target profile of the workpiece is not more than half of said center angle of said arc, resetting the inclination angle of the bisector so as to come close to said normal before satisfaction of said condition expires, and maintaining a center of curvature of said arc constantly positioned on said normal and maintaining a minimum distance between said center of curvature of the arc and said target profile constantly equal to a radius of curvature of said arc.

2. A numerically controlled grinding method as claimed in claim 1, wherein the grindstone is a disc-like rotary grindstone having an outer periphery which is arc-shaped in said section containing said axis of rotation, the center of curvature of said arc being positioned on a center line in said section and said center line corresponding to said bisector for the center angle of said arc.

3. A numerically controlled grinding method as claimed in claim 1, wherein said resetting step is carried out immediately before said absolute value of the difference between both inclination angles exceeds a value less, by a required angle of minimum relief, than half of said center angle of the arc.

* * * * *